United States Patent
Modi et al.

(10) Patent No.: US 10,459,725 B2
(45) Date of Patent: Oct. 29, 2019

(54) EXECUTION OF LOAD INSTRUCTIONS IN A PROCESSOR

(71) Applicant: MIPS Tech, LLC, Santa Clara, CA (US)

(72) Inventors: Harit Modi, San Jose, CA (US); Wayne Yamamoto, Saratoga, CA (US)

(73) Assignee: MIPS Tech, LLC, Campbell, CA (US)

(*) Notice: Subject to any disclaimer, the term of this patent is extended or adjusted under 35 U.S.C. 154(b) by 383 days.

(21) Appl. No.: 15/001,628

(22) Filed: Jan. 20, 2016

(65) Prior Publication Data
US 2017/0206086 A1    Jul. 20, 2017

(51) Int. Cl.
G06F 9/30    (2018.01)
G06F 9/38    (2018.01)

(52) U.S. Cl.
CPC ........ *G06F 9/30043* (2013.01); *G06F 9/3016* (2013.01); *G06F 9/3824* (2013.01); *G06F 9/3836* (2013.01)

(58) Field of Classification Search
CPC ... G06F 9/3836; G06F 9/3016; G06F 9/30043
See application file for complete search history.

(56) References Cited

U.S. PATENT DOCUMENTS 6,132,109 A * 10/2000 Gregory .............. G06F 17/5022
703/14

OTHER PUBLICATIONS

S. Kim et al; "Reducing Non-Deterministic Loads in Low-Power Caches via Early Cache Set Resolution"; Microprocessors and Microsystems 31, 2007; Elsevier; pp. 293-301.*
E. Morancho et al; "One-Cycle Zero-Offset Loads"; Second LASTED International Conference European Parallel and Distributes Systems (EuroPDS-98) pp. 87-93. Baden bei Wein, Austria. Jul. 1998.*
Austin, Todd & Sohi, G.S.. (1995). Zero-Cycle Loads: Microarchitecture Support for Reducing Load Latency. Proc 28th Annual Int Symp on Microarchitecture. 82-92. (Year: 1995).*
Kim, S., Vijaykrishnan, N., & Irwin, M.J. (2007). Reducing non-deterministic loads in low-power caches via early cache set resolution. Microprocessors and Microsystems, 31, 293-301. (Year: 2007).*
E. Morancho, J.M. Llabería, À. Olivé and M. Jiménez. "One-Cycle Zero-Offset Loads" In Second IASTED International Conference European Parallel and Distributes Systems (EuroPDS-98) pp. 87-93. Baden bei Wein, Austria. Jul. 1998. (Year: 1998).*

(Continued)

*Primary Examiner* — Benjamin P Geib
*Assistant Examiner* — Kasim Alli
(74) *Attorney, Agent, or Firm* — Adams Intellex, PLC

(57) ABSTRACT

Techniques for executing a load instruction in a processor are described. In one example, load instructions which are detected to have an offset (or displacement) of zero are sent directly to a data cache, bypassing the address generation stage thereby reducing pipeline length. Load instructions having a nonzero offset can be executed in an address generation stage as is conventional. To avoid conflicts between a current load instruction with zero offset and a previous load instruction with nonzero offset, the current instruction can be rescheduled or sent through a separate dedicated load pipe. An alternative technique permits a load instruction with zero offset to be issued one cycle earlier than it would need to be if it had a nonzero offset, thus reducing load latency.

11 Claims, 7 Drawing Sheets

(56) References Cited

OTHER PUBLICATIONS

Kim et al., "Reducing non-deterministic loads in low-power caches via early cache set resolution", Microprocessors and Microsystems, vol. 31, pp. 293-301, Elsevier, (2007).
Li et al., "Snug Set-Associative Caches—Reducing Leakage Power while Improving Performance", Proceedings of the 2005 International Symposium on Low Power Electronics and Design, pp. 345-350, (2005).
Morancho et al., "One-Cycle Zero-Offset Loads", Second IASTED International Conference European Parallel and Distributes Systems (EuroPDS-98), pp. 87-93. Baden bei Wein, Austria. Jul. 1998.
Combined Search and Examination Report for Application No. GB1604003.2, dated Jul. 29, 2016, six pages.

\* cited by examiner

EXECUTION OF LOAD INSTRUCTIONS IN A PROCESSOR

BACKGROUND

The latency and the throughput of the various instructions executed by a processor ultimately determine its performance. Pipelining in a processor is a technique where multiple instructions are overlapped in execution. Rather than processing each instruction sequentially by finishing one instruction before starting the next, each instruction is split into a sequence of steps which can be executed concurrently and in parallel. Pipelining increases instruction throughput by performing multiple operations concurrently but does not reduce latency, which is the time to complete a single instruction from start to finish.

The embodiments described below are provided by way of example only and are not limiting of implementations which solve any or all of the disadvantages of known processors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for executing a load instruction in a processor are described. In one example, load instructions which are detected to have an offset (or displacement) of zero are sent directly to the data cache, bypassing the address generation stage thereby reducing pipeline length. Load instructions having a nonzero offset are executed in an address generation stage as is conventional. To avoid conflicts between a current load instruction with zero offset and a previous load instruction with nonzero offset, the current instruction can be rescheduled or sent through a separate dedicated load pipe. An alternative technique permits a load instruction with zero offset to be issued one cycle earlier than it would need to be if it had a nonzero offset, thus reducing load latency.

A first aspect provides a method of executing a load instruction in a processor, the method comprising: receiving a load instruction which comprises a register value and an offset; detecting, in a detection circuit, whether the offset is zero or nonzero; processing the received load instruction having a detected zero offset according to a first mode of operation and processing the received load instruction having a detected nonzero offset according to a second mode of operation.

A second aspect provides a processor comprising: a detection circuit for receiving a load instruction comprising a register value and an offset and for detecting whether the offset is zero or nonzero; and a decision circuit for processing a received load instruction having a detected zero offset in accordance with a first mode of operation and for processing a received load instruction having a detected nonzero offset in accordance with a second mode of operation.

The processor may be embodied in hardware on an integrated circuit. There may be provided a method of manufacturing, at an integrated circuit manufacturing system, a processor. There may be provided an integrated circuit definition dataset that, when processed in an integrated circuit manufacturing system, configures the system to manufacture a processor. There may be provided a non-transitory computer readable storage medium having stored thereon a computer readable description of an integrated circuit that, when processed, causes a layout processing system to generate a circuit layout description used in an integrated circuit manufacturing system to manufacture a processor.

There may be provided an integrated circuit manufacturing system comprising a non-transitory computer readable storage medium having stored thereon a computer readable integrated circuit description that describes the processor; a layout processing system configured to process the integrated circuit description so as to generate a circuit layout description of an integrated circuit embodying the processor; and an integrated circuit generation system configured to manufacture the processor according to the circuit layout description.

There may be provided non-transitory computer readable storage medium having stored thereon computer readable instructions that, when executed at a computer system, cause the computer system to perform the method of the first aspect recited above.

The above features may be combined as appropriate, as would be apparent to a skilled person, and may be combined with any of the aspects of the examples described herein.

BRIEF DESCRIPTION OF THE DRAWINGS

Embodiments will be described, by way of example, with reference to the following drawings, in which.

Figure 1:
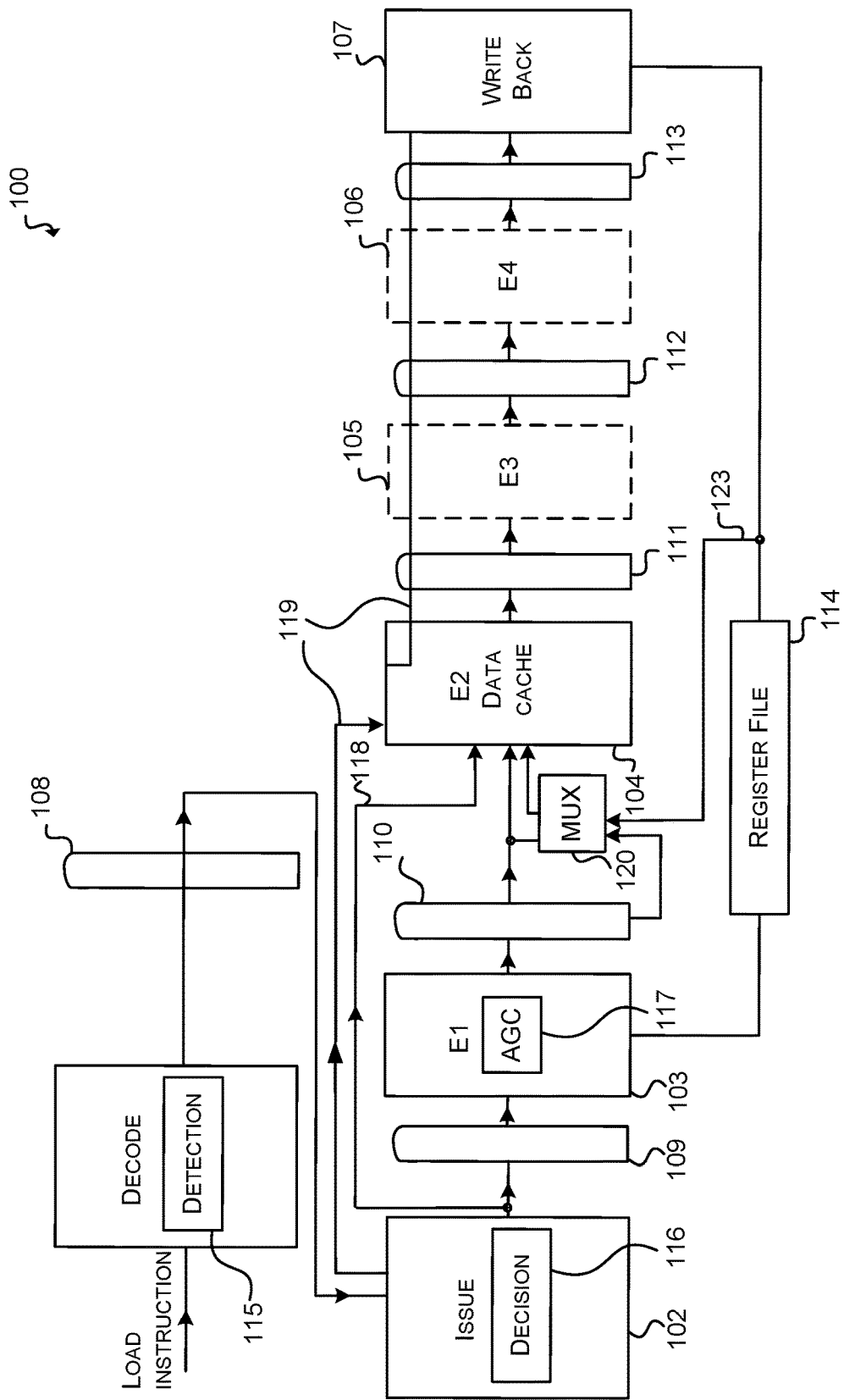
FIG. 1 is a schematic diagram of a processor.

The accompanying drawings illustrate various examples. Those skilled in the art will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments will be described by way of example only.

Load instructions arriving at a level 1 cache greatly influence performance in inverse proportion to their latency in clock cycles. A typical processor executes such load instructions with a latency of typically three or four clock cycles. Usually, the first cycle of latency is consumed by an address generation operation that is executed by a functional circuit often referred to as an address generation unit (AGU). An AGU computes an address based on adding, shifting and/or scaling one or more register values or constants. For example, an AGU uses a simple adder to generate an address by adding an offset (or displacement) to a fixed value. Although this operation is very simple, it takes up almost an entire clock cycle. In many cases, the value of the displacement field (that is, the offset) is zero. This is particularly likely to be true when traversing linked lists where the next pointer field of a node is the first member of the node structure. In such cases, the overall performance of the code is dependent on the load latency. Given that a fixed value plus zero is equal to just the fixed value, with no computation needed, the AGU stage in a pipeline is wasteful for such load instructions because the fixed value is already known before passing through the AGU stage.

Embodiments are described below by way of example only. The description sets forth the functions of the example and the sequence of steps for constructing and operating the example. However, the same or equivalent functions and sequences may be accomplished by different examples.

Described below are techniques for executing load instructions in a processor and particularly in a processor pipeline. Some of these techniques may be applied to in-order processors while other techniques are more appropriate for use with out-of-order processors. The techniques described permit the load latency of a pipelined load instruction process to be reduced. Load instructions having a displacement field (or offset) equal to zero are treated differently in certain execution stages of the pipeline than those instructions having an offset which is nonzero. Detection of the value of the offset may be performed by a detection circuit which may be included in a decode stage of a processor pipeline.

In some techniques, load instructions having a nonzero offset are directed to a first execution (E1) stage which includes an address generation circuit and those instructions having a zero offset bypass the address generation circuit and are directed to a second execution stage which may comprise a data cache. As, in the latter case, the address generation stage of the pipeline is skipped and the instruction is launched directly into the second execution (E2) stage, the load to load latency is reduced and also, the pipeline length of such a load is reduced by 1. The decision as to where to direct a load instruction may be taken by a decision circuit which may be included in an issue stage of a processor pipeline. Collisions in the second execution stage and any subsequent stages which may comprise the pipeline can, in theory, occur if on processor clock cycle number "X" say, a load instruction having a zero displacement were to be launched (by the decision circuit in the issue stage for example) when a load instruction having a nonzero displacement had been launched on the preceding processor clock cycle (X−1). That is to say that both load instructions would arrive at the E2 stage at the same time. Techniques are provided for avoiding such collisions. In one method, the load instruction having zero displacement is sent at a later time and another load instruction having a nonzero displacement is sent on cycle X instead. This method may be performed in an out-of-order processor. In another method, which may be performed in an in-order or an out-of order processor, the load instruction having zero displacement is treated as if it were one having nonzero displacement and is directed to the address generation circuit. In a further alternative method, which may be performed in an in-order or out-of-order processor, a load instruction having zero displacement is directed to the second execution stage via a dedicated load pipe. In this method the processor is provided with an additional pipe for handling the zero displacement load instructions.

An alternative technique for executing load instructions in a processor can reduce load latency by one cycle and in one example, from 4 cycles to 3 cycles. In this technique, both types of load instruction (that is with either nonzero displacement or zero displacement) pass through the address generation (E1) pipe stage but those load instructions having zero displacement can be launched one processor clock cycle earlier in the sequence of pipeline processing steps than a load instruction having a nonzero offset. The possibility of a collision does not arise when this technique is used because although the load instruction is launched one cycle early into the address generation stage, the result (which will be incorrect) is overwritten by the correct register value which arrives at the input of the E2 stage via a bypass. This alternative technique can be used with dynamically-scheduled out-of-order processors especially those that already feature a bypass into the post-address generation stage. It is equally applicable to in-order processors.

FIG. 1 shows a schematic diagram of part of an example processor 100 in which the methods described herein may be implemented. In this example the processor 100 is a single-threaded processor, however the methods are also applicable to multi-threaded processors.

The processor 100 comprises a plurality of pipeline stages 101-107 which are operably coupled in sequence through one of a plurality of pipeline registers 108-113. The processor also includes a register file 114. A decode stage 101 receives a load instruction. The load instruction may be provided via another stage, such as a fetch stage (not shown) and comprises a register value (or constant) and an offset (or displacement). The decode stage 101 includes a detection circuit 115. The following stage is an issue stage 102 which includes a decision circuit 116. Following the issue stage is a first execution stage (E1) 103 which includes an address generation circuit 117. The E1 stage may include one or more other functional units such as an arithmetic logic unit (not shown). Following the E1 stage is a second execution stage (E2) which comprises a data cache 104. Further execution stages follow and in this example two further execution stages (E3 and E4) 105, 106 are illustrated but there may be more or fewer. Execution stages may include one or more functional units such an arithmetic logic unit (ALU), floating point unit, branch unit for example. Following the final execution stage (E4) 106 is a write back stage 107. The write back stage has write access and the address generation unit 117 has read access to the register file 114. Thus a load instruction pipe exists through the stages from decode to write back, An optional bypass link 118 between an output of the issue stage 102 and an input of the data cache is provided for enabling one of several alternative load instruction execution methods to be described below. An optional, dedicated, additional load pipe 119 is provided from the issue stage 102 through to a second input of the data cache 104 (and bypassing the E1 stage) and subsequently through to the E3, E4 and write back stages 105, 106 and 107 respectively. This additional load pipe is provided for enabling another one of several load instruction execution methods to be described below. An optional multiplexer 120 is provided at an input to the data cache 104 for selecting between an output of the AGC 117 and a result that is being written into the register file 114 for enabling a further one of several alternative load instruction execution methods to be described below. It will be understood that the processor of FIG. 1 may include other conventional functional elements and bypass branches in addition to those shown.

The progressions of successive load instructions if they were to be processed in a conventional manner in the pipeline stages of the processor of FIG. 1 are illustrated in the table below. The first row shows processor clock cycle number (1-14). Each following row represents a new load instruction and shows during which cycle it goes through the various pipeline stages; from issue (IS) through execution stages E1, E2, E3, E4 to write back (WB).

| 1  | 2  | 3  | 4  | 5  | 6  | 7  | 8  | 9  | 10 | 11 | 12 | 13 | 14 |
|----|----|----|----|----|----|----|----|----|----|----|----|----|----|
| IS | E1 | E2 | E3 | E4 | WB |    |    |    |    |    |    |    |    |
|    |    | IS | E1 | E2 | E3 | E4 | WB |    |    |    |    |    |    |
|    |    |    |    | IS | E1 | E2 | E3 | E4 | WB |    |    |    |    |

In this example illustrated in the above table, as is conventional, load instructions with zero displacement are processed in the same manner as load instructions with nonzero displacement. That is to say that all load instructions go through the E1 stage where the address generation circuit performs an address generating computation. For every load instruction, the process from issue to write back takes six cycles.

By employing techniques as described herein, the pipeline length for a load instruction having a zero offset can be reduced by one and hence the load to load latency is reduced. This reduction in latency is illustrated in the table below which represents load instructions having zero offset skipping the E1 stage completely and being launched directly into the E2 stage. Comparison of the table below with the one above reveals that latency has been reduced and for each load instruction, the process from issue to write back takes only five cycles.

| 1  | 2  | 3  | 4  | 5  | 6  | 7  | 8  | 9  | 10 | 11 | 12 | 13 | 14 |
|----|----|----|----|----|----|----|----|----|----|----|----|----|----|
| IS | E2 | E3 | E4 | WB |    |    |    |    |    |    |    |    |    |
|    |    | IS | E2 | E3 | E4 | WB |    |    |    |    |    |    |    |
|    |    |    |    | IS | E2 | E3 | E4 | WB |    |    |    |    |    |

By employing alternative techniques described herein, the load latency can be reduced by launching a load instruction, which has a zero offset, one cycle earlier than it would be launched when using the conventional methods. In this technique, the E1 stage is not skipped but the result of the address generation circuit's computation is overwritten and no conflict can arise between a load instruction with zero offset and a load instruction with a nonzero offset. The reduction in latency is illustrated in the table below where (as in the first table above) successive load instructions move through the various processing steps. In this table, 'AG' represents address generation and is equivalent to E1 of the previous tables. A new load instruction can be launched (IS) while the current load instruction is at the E3 stage (instead of the E4 stage as it would be if conventional methods were used) and write back (WB) for subsequent load instructions occurs progressively earlier. The table below illustrates that write back (WB) of a current instruction can happen at E2 of a new instruction. This reduces the load to load latency from 4 to 3 cycles. For example, if a load instruction depends on a previous instruction, a load instruction having a zero offset can be issued one cycle earlier relative to the previous instruction that generates the address for the load. In contrast, in the examples illustrated in the tables above, the E1 stage of the received load starts in parallel with the WB stage, but in the alternative example illustrated in the table below, the E1 stage can start a cycle before WB of the previous instruction and the result of WB is bypassed directly to E2. The input to E2 is "base register plus offset". Since the offset is zero, the "base register" that is being generated by the previous instruction is passed directly to E2 without needing to go through E1. A multiplexer is employed to enable this alternative method in a manner described below.

| 1  | 2  | 3  | 4  | 5  | 6  | 7  | 8  | 9  | 10 | 11 | 12 | 13 | 14 |
|----|----|----|----|----|----|----|----|----|----|----|----|----|----|
| IS | AG | E2 | E3 | E4 | WB |    |    |    |    |    |    |    |    |
|    |    | IS | AG | E2 | E3 | E4 | WB |    |    |    |    |    |    |
|    |    |    |    | IS | AG | E2 | E3 | E4 | WB |    |    |    |    |

Figure 2:
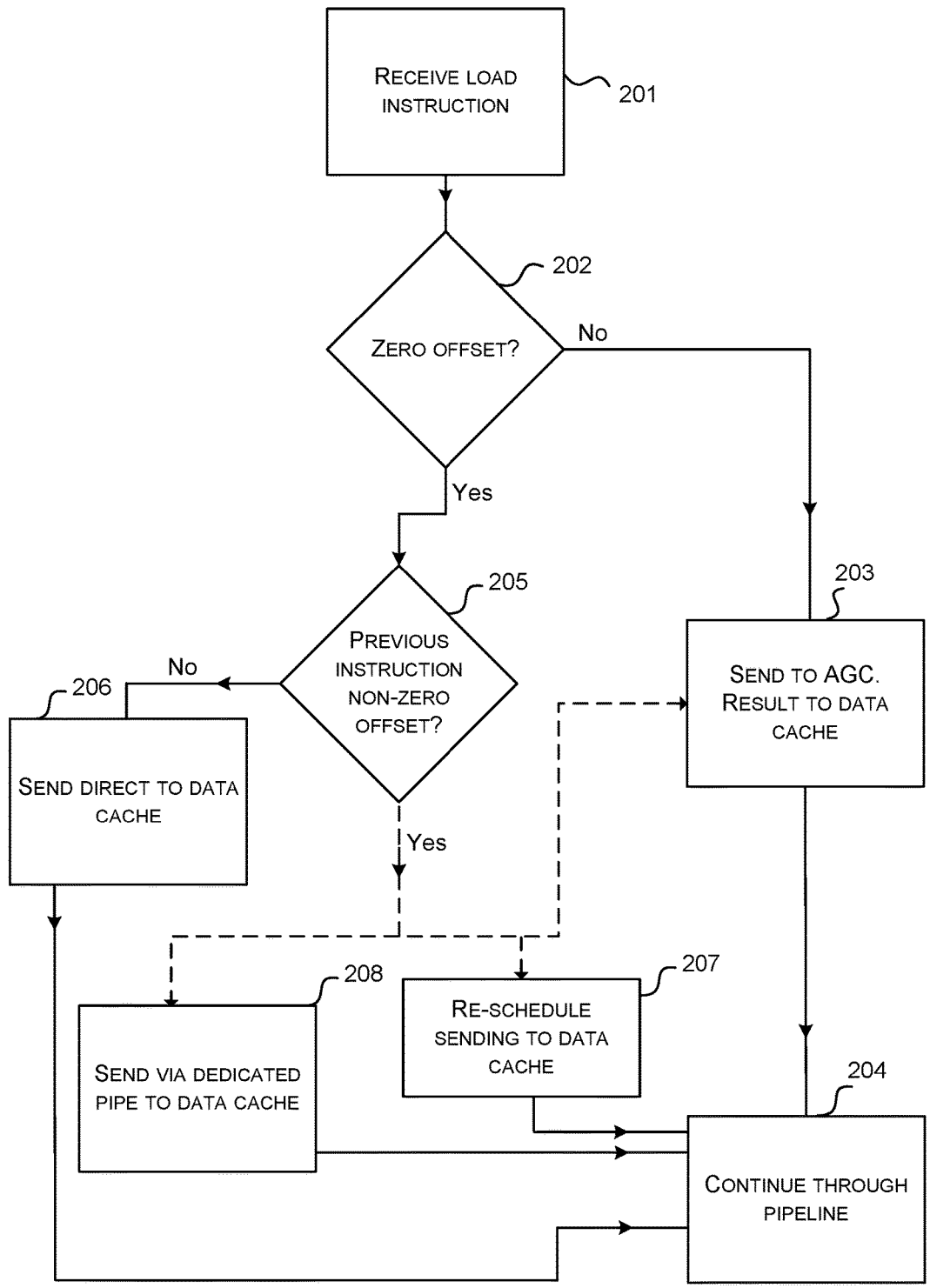
FIG. 2 is a flow diagram illustrating various alternative methods for executing a load instruction.
Figure 4:
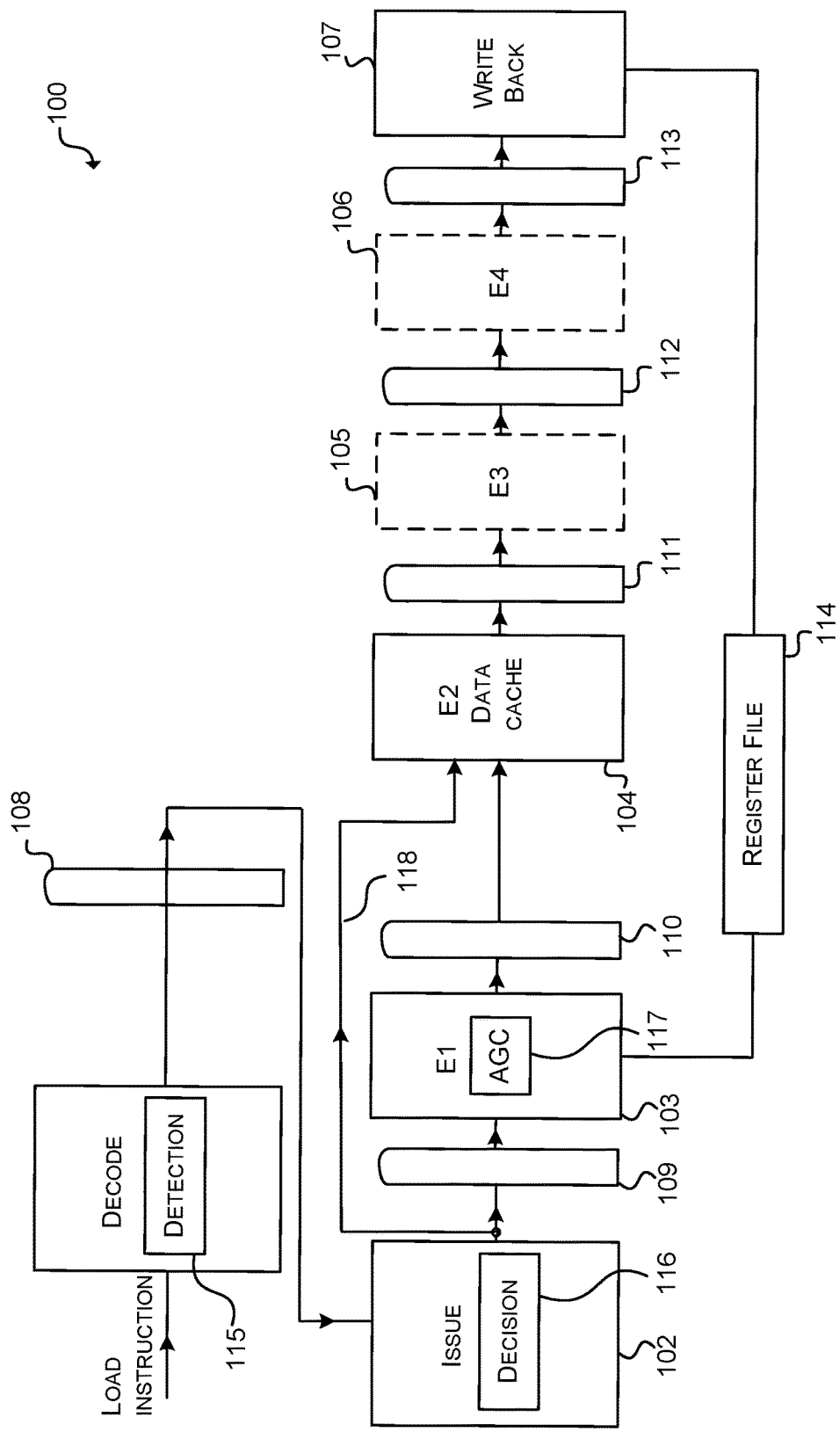
FIG. 4 is a schematic diagram of the processor of FIG. 1 configured to execute a load instruction in accordance with a first and a second method.

Referring now to the flow diagram of FIG. 2 and to FIG. 4, methods for executing a load instruction will now be described. The processor 100 of FIG. 4 includes the bypass link 118 between the issue stage 102 and the E2 stage 104. At 201, a load instruction is received by the detection circuit 115 in the decode stage 101 and at 202, it is determined whether or not the offset contained in the current load instruction is zero. If the offset is nonzero, then the process progresses to 203 where the decision circuit 116 in the issue stage 102 sends the load instruction to the address generation circuit (AGC) 117 via line 121. The process continues, 204, thereafter through the following pipeline stages in accordance with conventional techniques with the address generation circuit operating on the load instruction and the result being used to load a value from memory (e.g. the data cache 104) to a register (e.g. in the register file 114) via the write back stage 107.

If, at 202, it is determined that the offset of a current load instruction is zero, then the process progresses to 205 where it is determined whether the previous load instruction had a nonzero or zero offset. If it is determined that the previous load instruction had a zero offset, then no possibility of a conflict arises and the process can progress to 206 where the decision circuit 116 sends the current load instruction straight to the data cache 104 in the E2 stage over the bypass link 118, bypassing the address generation unit 117 in the E1 stage 103. The process then progresses through the remaining pipeline stages in the conventional manner.

If, at 205, it is determined that the current load instruction immediately follows a previous load instruction having a nonzero offset, then a possibility of a conflict arises. At this point the process can take one of three alternative paths in order to avoid a possible conflict. In the first alternative path, the decision circuit 116 treats the current load instruction as if it were a load instruction with nonzero offset and sends it, to the address generation circuit via line 121 (203). In the second alternative path, the decision circuit 116 reschedules the current load instruction for sending to the data cache (via the bypass link 118) at a later time and another nonzero load instruction is sent insteadvia line 121(207). For enabling the second alternative path, the processor 100 is an out of-order processor.

Figure 5:
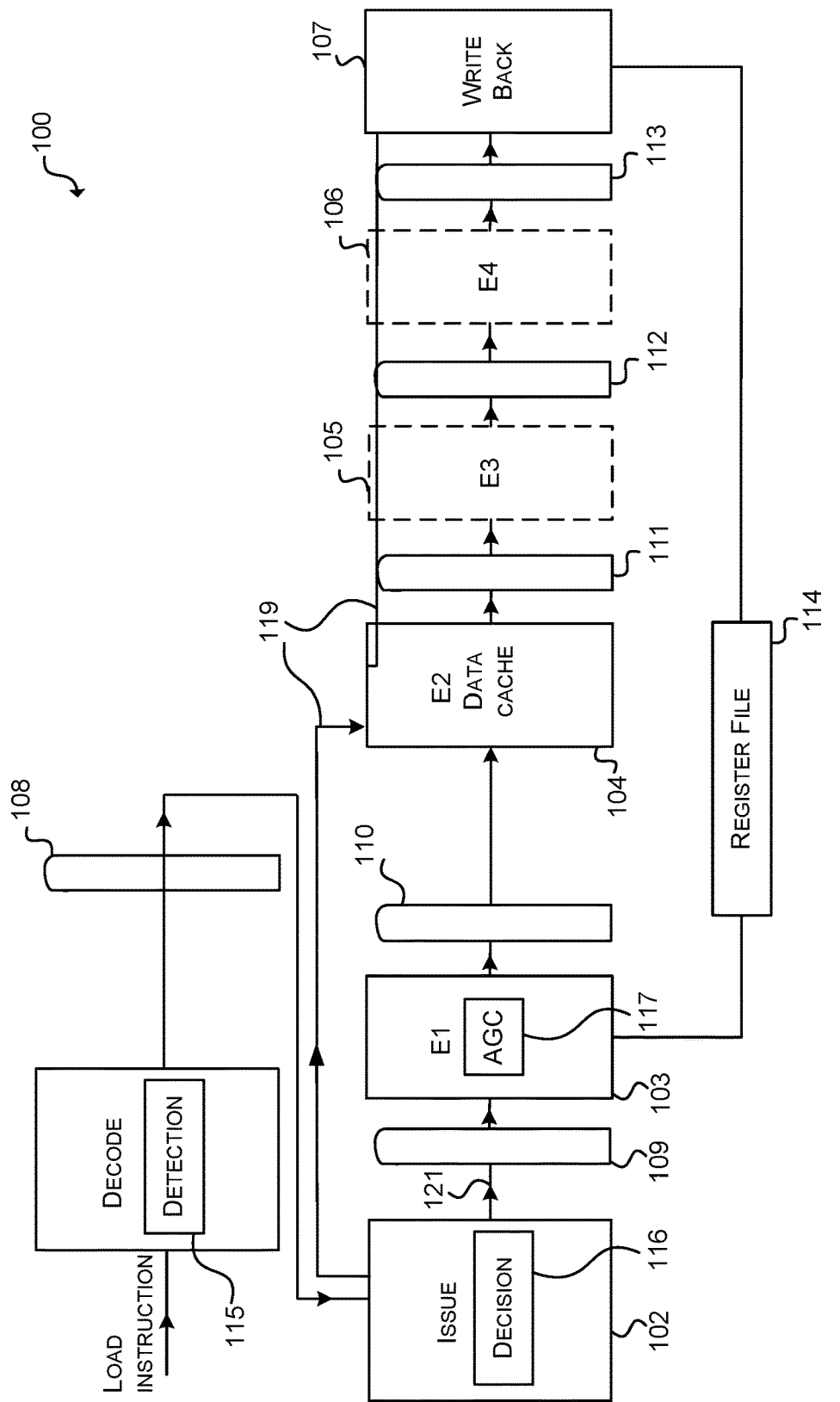
FIG. 5 is a schematic diagram of the processor or FIG. 1 configured to execute a load instruction in accordance with a third method.

The third alternative path will now be described with reference to FIG. 5 and the flow chart of FIG. 2. The processor of FIG. 5 includes the additional, dedicated load pipe 119 and the data cache 104 includes a second input 122. At 202, it has been determined that the current load instruction has a zero offset. At 205 it has been determined that the previous instruction has a nonzero offset and therefore, once again, the possibility of a conflict arises. To avoid any conflict, the decision circuit 116 sends the current load instruction through the dedicated pipe 119 to the second input 122 of the data cache 104 (208) and the process progresses through the subsequent stages through this dedicated pipeline.

Figure 3:
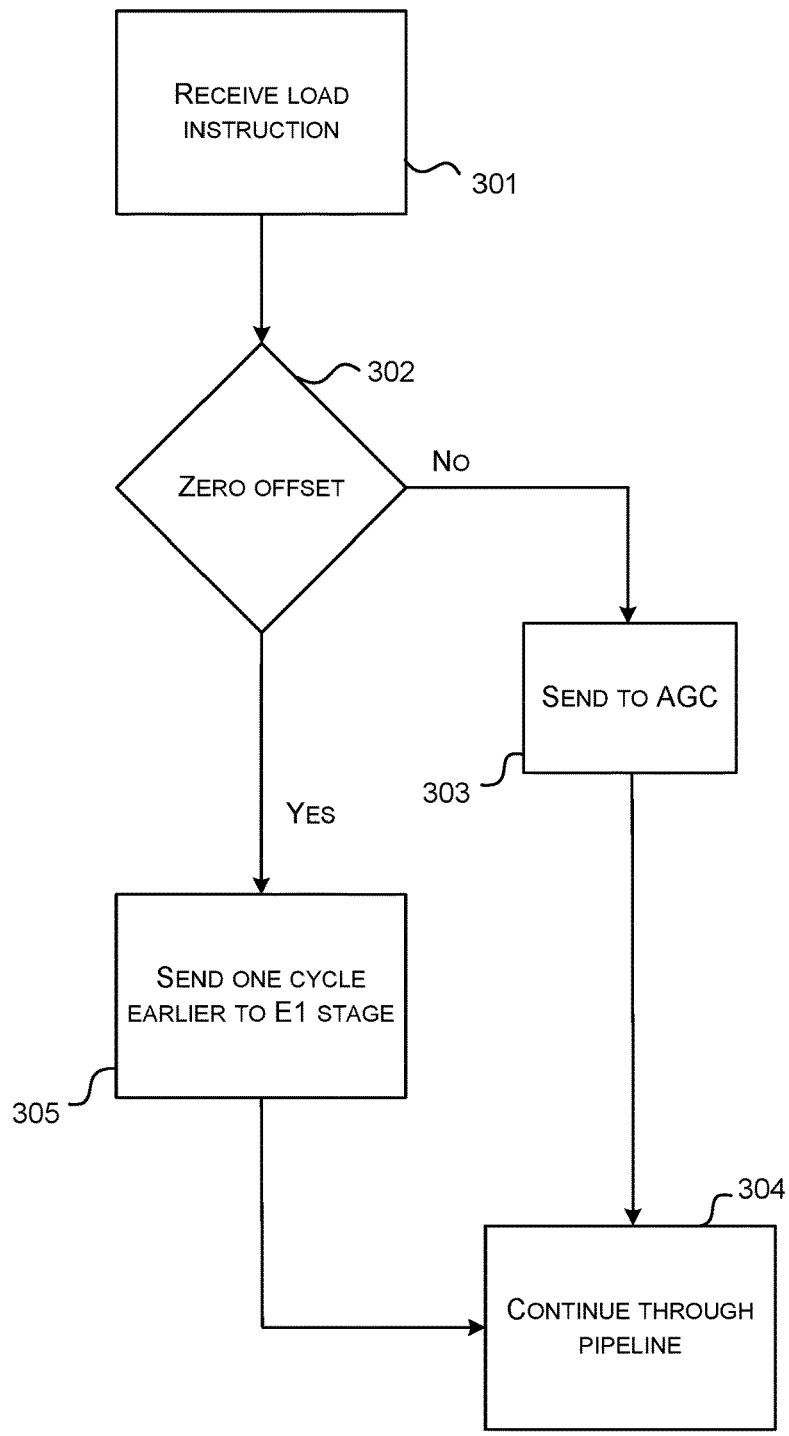
FIG. 3 is a flow diagram illustrating a further alternative method for executing a load instruction.
Figure 6:
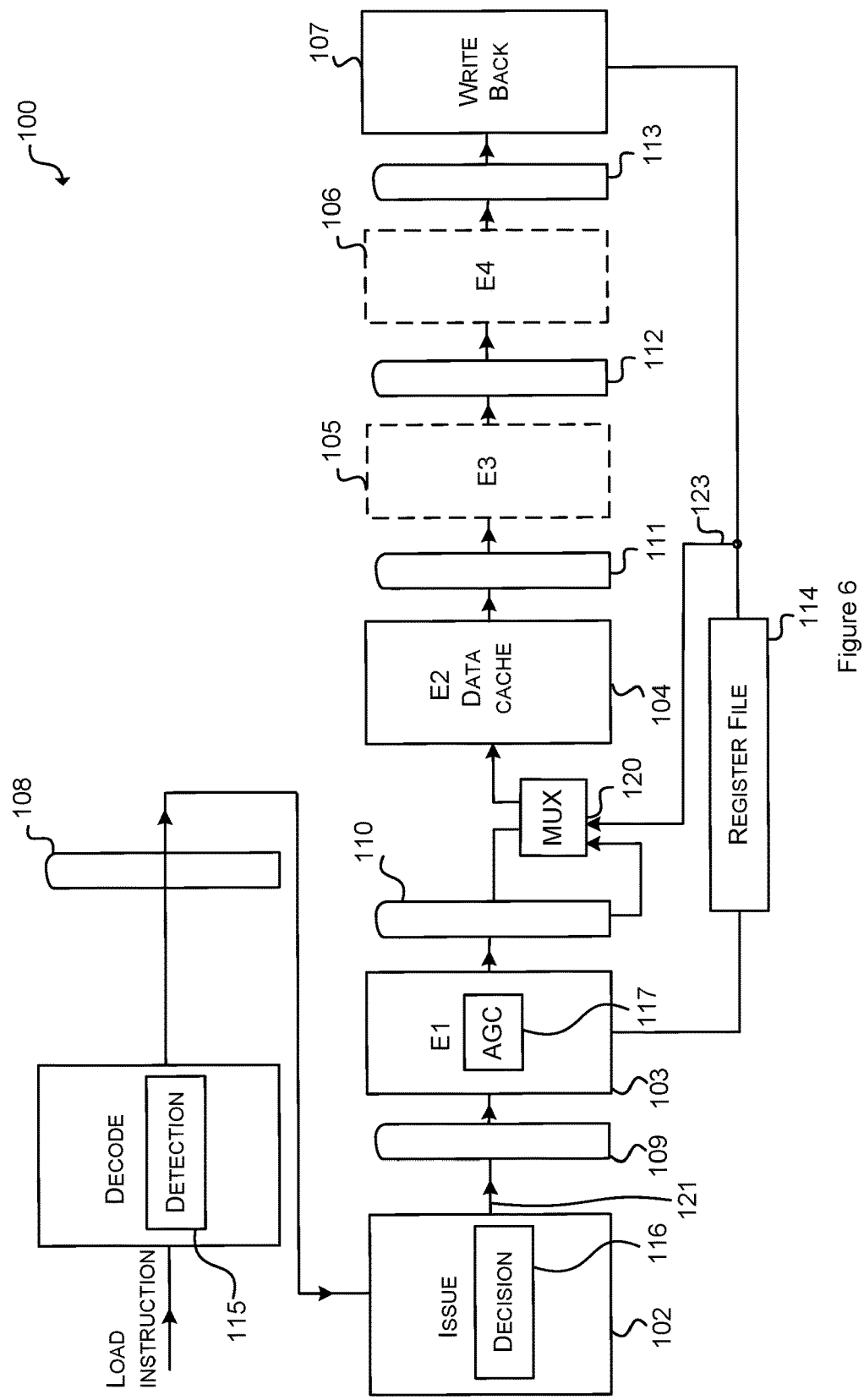
FIG. 6 is a schematic diagram of the processor of FIG. 1 configured to execute a load instruction in accordance with a fourth method.

An alternative method for executing a load instruction will now be described with reference to the flow diagram of FIG. 3 and to FIG. 6. The processor 100 of FIG. 6 is provided with a bypass network at an input of the post-AGC stage. There can be a variety of producer pipes or units that could feed a load instruction but such a bypass operation can be most economically carried out in the AGC stage itself by using a single minimal 2:1 bypass multiplexer 120 at the input of the post-AGC stage. At 301, a load instruction is received by the detection circuit 115 in the decode stage 101 and at 302, it is determined whether or not the offset contained in the current load instruction is zero. If the offset is nonzero, then the process progresses to 303 where the decision circuit 116 in the issue stage 102 sends the load instruction to the address generation circuit (AGC) via line 121. Specifically, the load instruction is sent to the AGC after the input register value is ready. The process continues (304) thereafter through the following pipeline stages in accordance with conventional techniques with the address generation circuit operating on the load instruction and the result being used to load a value from memory (e.g. the data cache 104) to a register (e.g. in the register file 114) via the write back stage 107.

If, at 302 it is determined that the offset of a current load instruction is zero, then the decision circuit 116 in the issue stage 102 sends, at 305, the current load instruction to the E1 stage via line 121 one cycle earlier than it would do if the load instruction had a nonzero offset and the output from the address generation circuit 117 is overwritten in the data cache 104 by a result that is being written into the register file 114 from the write back stage 107 and selected by the multiplexer 120 via a bypass 123. Specifically, the current load instruction is sent to the AGC one cycle before the input register value is ready. In one example, the current instruction is launched from the issue stage when the previous instruction is in the E3 stage. The process continues, 304, thereafter through the following pipeline stages in accordance with conventional techniques with the address generation circuit operating on the load instruction and the result being used to load a value from memory (e.g. the data cache 104) to a register (e.g. in the register file 114) via the write back stage 107. In an alternative arrangement, the bypass 123 may be configured to provide a selectable input to the data cache 104 which is derived from any processing unit if it provides the address of the specified load. It will be understood that a value from the bypass line 123 is not necessarily used blindly. If the value of the register that forms the address of the load has already been written, then the input from the register file 114 is used. If the value of the register is coming from another instruction in the pipeline, then the value from the bypass line 123 is used.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a processor configured to perform any of the methods described herein, or to manufacture a processor comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII.

Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processor will now be described with respect to FIG. 7.

Figure 7:
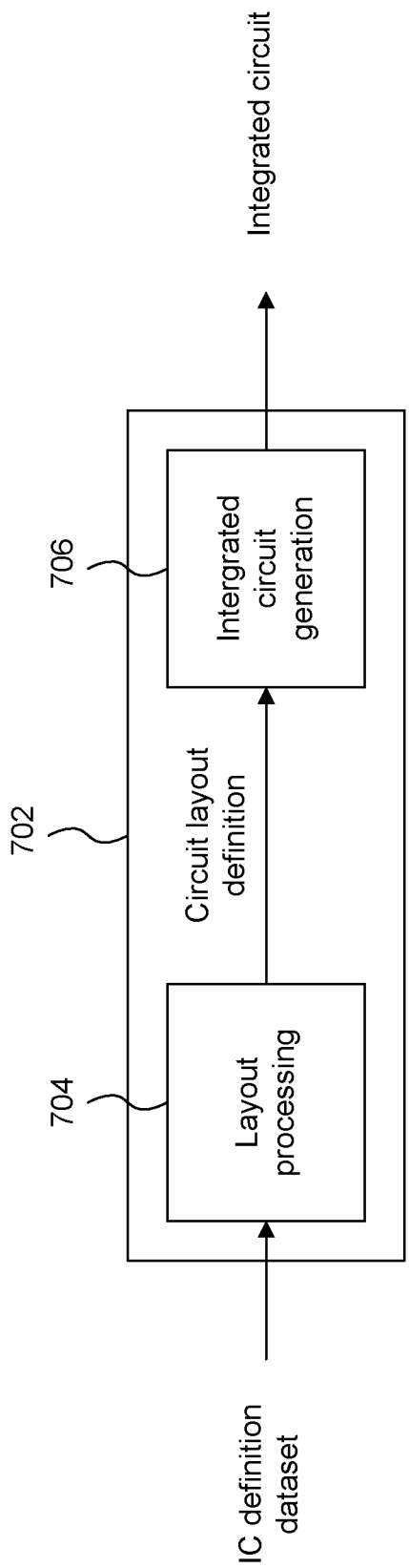
FIG. 7 is a schematic block diagram of an example of an integrated circuit manufacturing system.

FIG. 7 shows an example of an integrated circuit (IC) manufacturing system 702 which comprises a layout processing system 704 and an integrated circuit generation system 706. The IC manufacturing system 702 is configured to receive an IC definition dataset (e.g. defining a processor as described in any of the examples herein), process the IC definition dataset, and generate an IC according to the IC definition dataset (e.g. which embodies a processor as described in any of the examples herein). The processing of the IC definition dataset configures the IC manufacturing system 702 to manufacture an integrated circuit embodying a processor as described in any of the examples herein.

The layout processing system 704 is configured to receive and process the IC definition dataset to determine a circuit layout. Methods of determining a circuit layout from an IC definition dataset are known in the art, and for example may involve synthesizing RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimize the circuit layout. When the layout processing system 704 has determined the circuit layout it may output a circuit layout definition to the IC generation system 706. A circuit layout definition may be, for example, a circuit layout description.

The IC generation system 706 generates an IC according to the circuit layout definition, as is known in the art. For example, the IC generation system 706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 706 may be in the form of computer-readable code which the IC generation system 706 can use to form a suitable mask for use in generating an IC.

The different processes performed by the IC manufacturing system 702 may be implemented all in one location, e.g. by one party. Alternatively, the IC manufacturing system 702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processor without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of executing a load instruction in a processor, the method comprising:
   receiving a load instruction which includes a register value and an offset;
   detecting, in a detection circuit, whether the offset is zero or nonzero;
   when the detected offset is nonzero, directing, by a decision circuit, the received load instruction to an address generation circuit in a first execution stage of the processor, and
   when the detected offset is zero, identifying, in the decision circuit, whether the received load instruction immediately follows a load instruction having a zero offset or a nonzero offset, and
   when the received load instruction immediately follows a load instruction having a zero offset, bypassing the address generation circuit and directing the received load instruction to a further execution stage of the processor, and when the received load instruction immediately follows a load instruction having a nonzero offset, either delaying directing the received load instruction to the further execution stage and sending another received load instruction with a detected nonzero offset to the address generation circuit instead; or directing the received load instruction to the further execution stage via a dedicated load pipe.

2. A processor comprising:

a detection circuit for receiving a load instruction including a register value and an offset and for detecting whether the offset is zero or nonzero;

a decision circuit configured to process the received load instruction;

a first execution stage including an address generation circuit configured to generate an address from the received load instruction;

a further execution stage;

a bypass link between the decision circuit and an input to the further execution stage; and a dedicated load pipe linking the decision circuit with the further execution stage, and wherein the decision circuit is arranged to direct the received load instruction having a detected nonzero offset to the address generation circuit, wherein the decision circuit is arranged to identify that the received load instruction has a zero offset and immediately follows a load instruction having a zero offset and to direct the received load instruction to the further execution stage via the bypass link, wherein the decision circuit is arranged to identify that the received load instruction has a zero offset and immediately follows a load instruction having a nonzero offset and either to delay directing the received instruction load to the further execution stage and to send another received instruction load with a detected nonzero offset to the address generation circuit or to direct the identified load instruction to the further execution stage via the dedicated load pipe.

3. The processor according to claim 2, wherein the processor includes a decode stage and an issue stage, and wherein the decode stage includes the detection circuit, the issue stage includes the decision circuit and the further execution stage comprises a data cache.

4. The processor according to claim 2, wherein the further execution stage comprises a data cache including a dedicated input for receiving a load instruction having a zero offset through said dedicated load pipe.

5. A non-transitory computer readable storage medium having stored thereon a computer readable description of an integrated circuit that, when processed in an integrated circuit manufacturing system, causes the integrated circuit manufacturing system to manufacture a processor as claimed in claim 2.

6. An integrated circuit definition dataset embodied in a non-transitory computer readable storage medium that, when processed in an integrated circuit manufacturing system, configures the integrated circuit manufacturing system to manufacture a processor as claimed in claim 2.

7. The processor according to claim 2, wherein the processor is embodied in hardware on an integrated circuit.

8. The processor according to claim 2 wherein the processor is an in-order processor.

9. The processor according to claim 2 wherein the dedicated load pipe comprises a dedicated physical electrical connection.

10. The processor according to claim 2 wherein the bypass link comprises a physical electrical connection.

11. A non-transitory computer readable storage medium having encoded thereon computer instructions that when executed cause at least one processor to:

receive a load instruction which includes a register value and an offset; detect whether the offset is zero or nonzero;

when the detected offset is nonzero, direct the received load instruction to an address generation circuit in a first execution stage of the processor, and when the detected offset is zero, identify whether the received load instruction immediately follows a load instruction having a zero offset or a nonzero offset, and when the received load instruction immediately follows a load instruction having a zero offset, bypass the address generation circuit and direct the received load instruction to a further execution stage of the processor, and when the received load instruction immediately follows a load instruction having a nonzero offset, either delay directing the received load instruction to the further execution stage and send another received load instruction with a detected nonzero offset to the address generation circuit instead; or direct the received load instruction to the further execution stage via a dedicated load pipe.

* * * * *